US012045299B2

(12) United States Patent
Shang

(10) Patent No.: US 12,045,299 B2
(45) Date of Patent: Jul. 23, 2024

(54) METHOD FOR DISPLAYING THE SEARCH RESULTS OF A COMPONENT E-COMMERCE PLATFORM BY CLASSIFICATION

(71) Applicant: SHENZHEN SEKORM COMPONENT NETWORK CO., LTD, Guangdong (CN)

(72) Inventor: Lianglei Shang, Guangdong (CN)

(73) Assignee: SHENZHEN SEKORM COMPONENT NETWORK CO., LTD, Shenzhen (CN)

(*) Notice: Subject to any disclaimer, the term of this patent is extended or adjusted under 35 U.S.C. 154(b) by 384 days.

(21) Appl. No.: 17/420,312

(22) PCT Filed: Jun. 30, 2020

(86) PCT No.: PCT/CN2020/099410
§ 371 (c)(1),
(2) Date: Jul. 1, 2021

(87) PCT Pub. No.: WO2022/000302
PCT Pub. Date: Jan. 6, 2022

(65) Prior Publication Data
US 2022/0207104 A1    Jun. 30, 2022

(51) Int. Cl.
*G06F 16/00*        (2019.01)
*G06F 3/04812*      (2022.01)
(Continued)

(52) U.S. Cl.
CPC ...... *G06F 16/9538* (2019.01); *G06F 3/04812* (2013.01); *G06F 16/9558* (2019.01); *G06Q 30/0601* (2013.01); *G06F 2203/04801* (2013.01)

(58) Field of Classification Search
None
See application file for complete search history.

(56) References Cited

U.S. PATENT DOCUMENTS 7,840,893 B2 * 11/2010 Kulas .................... G06F 16/951
715/234
8,037,060 B1   10/2011 Wang
(Continued)

FOREIGN PATENT DOCUMENTS

CN    101566984 A    10/2009
CN    105630969 A    6/2016
(Continued)

OTHER PUBLICATIONS

The second office action of CN patent application No. 202010616059.9 issued on Oct. 27, 2023.
(Continued)

*Primary Examiner* — Debbie M Le
(74) *Attorney, Agent, or Firm* — Andrew C. Cheng

(57) ABSTRACT

The invention relates to method for displaying the search results of the component e-commerce platform by classification. The method comprises the following steps of: S1, receiving a search keyword and sending the search keyword to a website server; S2, inquiring to obtain the data files containing the search keywords and gathering the data files with the same type labels into an aggregation column; S3, calculating the file weight value of each data file and sorting all the data files in each aggregation column from large to small according to the file weight value; S4, taking the maximum file weight value in each aggregation column as a column item weight value of the aggregation column, and all the aggregation column are sorted from large to small according to the column item weight values; and S5, sending
(Continued)

the query results of the classification and sorting to a webpage for display by the website server.

9 Claims, 1 Drawing Sheet

(51) Int. Cl.
  *G06F 16/9538* (2019.01)
  *G06F 16/955* (2019.01)
  *G06Q 30/0601* (2023.01)

(56) References Cited

U.S. PATENT DOCUMENTS 8,631,009 B2 * 1/2014 Lisa ...................... G06F 16/338
  707/758
10,409,849 B2 * 9/2019 Wang ................. G06Q 30/0275
11,494,454 B1 * 11/2022 Gordon ................. G06F 16/212
2006/0242553 A1 10/2006 Kulas

FOREIGN PATENT DOCUMENTS

CN   106503258 A   3/2017
CN   106776910 A   5/2017

OTHER PUBLICATIONS

The search report of CN patent application No. 202010616059.9 issued on Oct. 27, 2023.
The Decision of Rejection of CN patent application No. 202010616059.9 issued on Mar. 22, 2024.
The search report of CN patent application No. 202010616059.9 issued on Mar. 22, 2024.

* cited by examiner

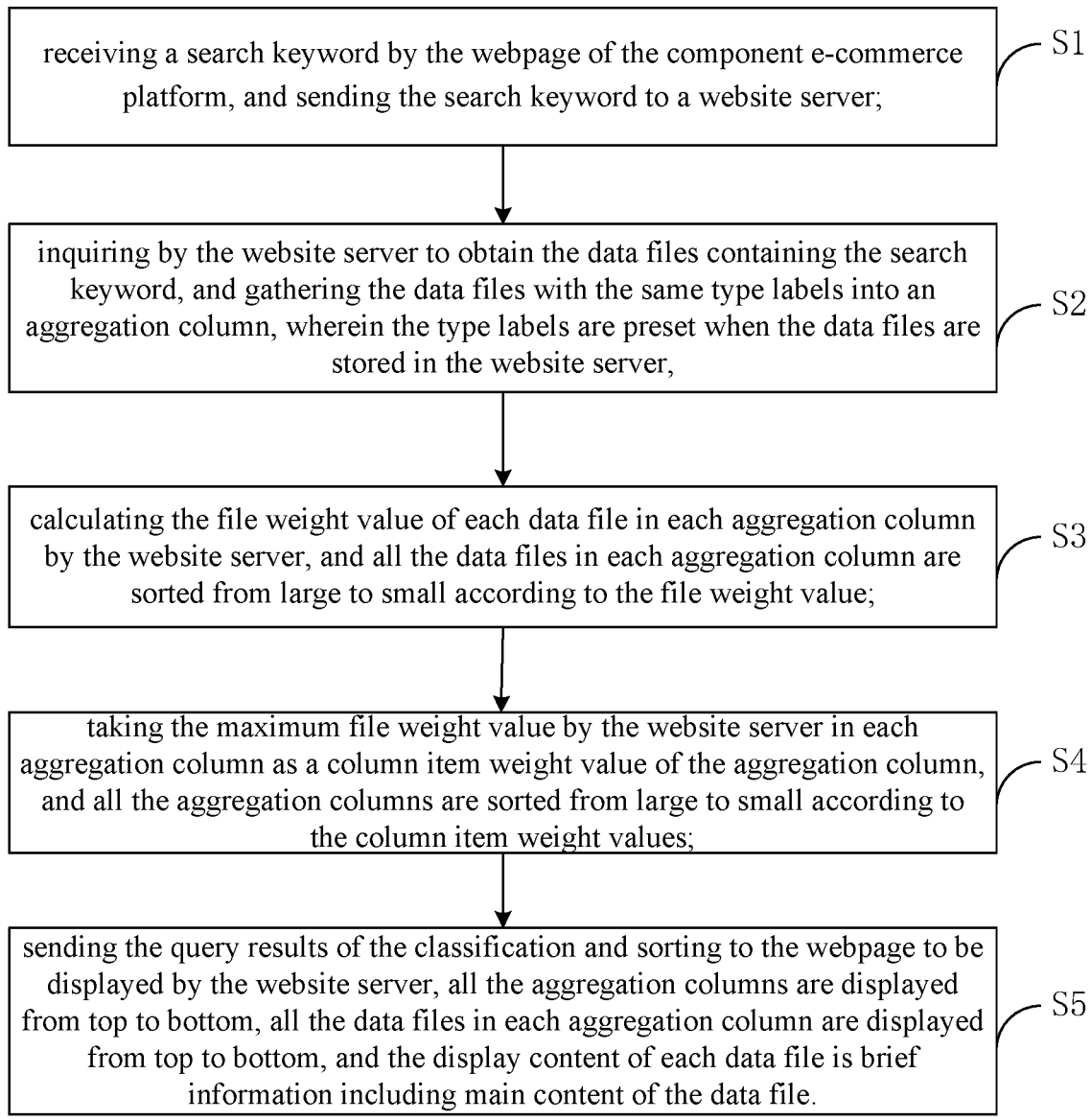

METHOD FOR DISPLAYING THE SEARCH RESULTS OF A COMPONENT E-COMMERCE PLATFORM BY CLASSIFICATION

CROSS-REFERENCE RELATED TO APPLICATIONS

This application is the national stage application under 35 U.S.C. 371 of International Patent Application No. PCT/CN2020/099410 filed on Jun. 30, 2020, which is incorporated herein by reference in its entirety.

BACKGROUND OF THE INVENTION

1. Technical Field

The invention relates to the field of component e-commerce platforms, in particular to a method for displaying the search results of a component e-commerce platform by classification.

2. Description of Related Art

The component e-commerce platform contains a large number of electronic components and related information, users can use the search function of the website to find the electronic components they need, but the existing component e-commerce platform is sorted according to the matching weight, from high to low. If several content types are mixed together, because the content structures of different content types are inconsistent, the search terms account for a high proportion in the content according to the rules of the search engine, and the calculation weight is high; and if the question and answer are mixed with information, the question and answer are presented too much in the front part of a list of the search engine, so that some high-quality information is presented so little in the front part of the list, and that the purpose of searching by a user cannot be achieved.

At present, the common solution is to highlight the gamut of key content on the UI, or reduce the weight of content type, but it will lead to the problem that it cannot cover all user scenarios, reducing the weight of content type will lead to the situation that users cannot get what they need when they really look for the answers, which has a paradox between user needs. It cannot be reconciled in a purely search engine weighting way.

BRIEF SUMMARY OF THE INVENTION

The technical problem to be solved by the invention is to provide a method for displaying the search result of a component e-commerce platform by classification aiming at the defects of the prior art.

The technical scheme adopted by the invention to solve the technical problem is as follows: a method for displaying the search result of a component e-commerce platform by classification is constructed, wherein a website server of the component e-commerce platform stores webpage data and related information of various components, and the method comprises the following steps:

S1, receiving a search keyword by the webpage of the component e-commerce platform, and sending the search keyword to the website server;

S2, inquiring by the website server to obtain the data files containing the search keyword, and gathering the data files with same type labels into an aggregation column, wherein the type labels are preset when the data files are stored in the website server, and the type labels comprise technical frequently asked questions (FAQs), information, type selection guides, test reports, datasheets, product change notice and end-of-life (EOL) information, software development environment, hardware development environment;

S3, calculating the file weight value of each data file in each aggregation column by the website server, and all the data files in each aggregation column are sorted from large to small according to the file weight value;

S4, taking the maximum file weight value by the website server in each aggregation column as a column item weight value of the aggregation column, and all the aggregation columns are sorted from large to small according to the column item weight values;

S5, sending the query results of the classification and sorting to the webpage to be displayed by the website server, all the aggregation columns are displayed from top to bottom, all the data files in each aggregation column are displayed from top to bottom, and the display content of each data file is brief information including main content of the data file.

Further, in the method for displaying the search result of the component e-commerce platform by classification according to the present invention, the step of inquiring by the website server to obtain the data file including the search keyword in step S2 comprises:

inquiring to obtain the data files containing the search keywords, calculating the file weight values of all the data files, sorting all the data files according to the file weight values, and screening out a preset search number of data files in front of the sorting by the website server.

Further, in the method for displaying the search results of the component e-commerce platform by classification according to the present invention, the step of displaying all the data files in each aggregation column according to the sequence from top to bottom in the step S5 comprises S51, judging whether the number of the data files in each aggregation column is larger than a preset display number;

S52, if it is, displaying the preset number of data files at the top of the order in the aggregation column, and displaying an extended reading flag below the last data file;

S53. if the extended reading flag receives an extended viewing instruction, a new webpage is popped up to display all the data files in the aggregation column.

Furthermore, in the method for displaying the search results of the component e-commerce platform by classification, the brief information of each data file in the step S5 comprises a file title, a file abstract, a type label and a release date.

Furthermore, in the method for displaying the search results of the component e-commerce platform by classification, the file title, the file abstract, the type label and the release date of each data file in the step S5 are distinguished by one or more of font color, background color, font size, font grayscale and highlight.

Furthermore, in the method for displaying the search results of the component e-commerce platform by classification, the display areas of the different aggregation columns in the step S5 are distinguished by one or more of font color, background color, font size, font grayscale and highlight.

Further, in the method for displaying the search results of the component e-commerce platform by classification, in the step S5, one or more of font color, background color, font size, font grayscale and highlight are used to highlight the search keyword.

Furthermore, in the method for displaying the search results of the component e-commerce platform by classification, if a certain display content of the data file is a hyperlink, when the mouse cursor is moved to the hyperlink, the display color of the display content is correspondingly changed and/or the mouse cursor is deformed.

Furthermore, in the method for displaying the search results of the component e-commerce platform by classification according to the present invention, after step S5, the method further comprises:

S6, popping up a new webpage to display a webpage corresponding to the data file or the hyperlink if an open instruction is received by the hyperlink corresponding to one of the data files or one of the display content in the webpage.

Furthermore, in the method for displaying the search results of the component e-commerce platform by classification, the type label further comprises FAQs, comparison tables, successful cases, model naming rules, electronic component function block diagrams, application handwriting, design guides, application and schemes, user guides, circuit schematic diagrams, development codes, inventory lists, supplier introduction, evaluation board use instructions, training documents, electronic components application and introduction;

each data file can be provided with one or more type tags.

The method for displaying the search results of the component e-commerce platform by classification has the following beneficial effects that the same content types are aggregated and displayed, so that the effect of visual focus can be achieved, the method is clear in structure and prominent in focus, a user can conveniently and pertinently browse the query results, and the query efficiency is improved.

BRIEF DESCRIPTION OF THE SEVERAL VIEWS OF THE DRAWINGS

Brief description of that drawing the invention will now be further described by way of example with reference to the accompany drawings in which:

FIG. 1 is a flowchart of a method for displaying search results of a component e-commerce platform according to Embodiment 1.

DETAILED DESCRIPTION OF THE INVENTION

For a clearer understanding of the technical features, objects and effects of the present invention, a detailed description will now be given of specific embodiments of the present invention with reference to the accompanying drawings.

Embodiment 1

Referring to FIG. 1, the method for displaying the search results of a component e-commerce platform by classification of this embodiment is applied to a component e-commerce platform, which includes a website server, where webpage data and related information of various components are stored, and the webpage data can be displayed on a browser of a user terminal. Users can search for the required electronic components, view the search results, purchase electronic components and other operations on the component e-commerce platform. The method for displaying the search results of a component e-commerce platform by classification comprises the following steps:

S1, receiving a search keyword by a webpage of the component e-commerce platform and sending the search keyword to a website server. A search box is arranged in a webpage of the component e-commerce platform, a user inputs a search keyword in the search box, and the search keyword is sent to a website server. Alternatively, the search box of this embodiment has a search word recommendation function, and the search keyword currently input by the user is sent to the website server, and the website server sends the vocabulary related to the currently inputted search keyword to the user terminal, and displays the vocabulary in the drop-down box of the search box for the user to select, so as to improve the input efficiency of the user.

S2, inquiring the website server to obtain the data files containing the search keywords, and gathering the data files with the same type labels into an aggregation column, wherein the type labels are preset when the data files are stored in the website server, and the type labels comprise technical FAQs, information, type selection guides, test reports, data manuals, product change notice and EOL information; software development environment, hardware development environment.

Specifically, the website server queries to obtain the data files containing the search keywords, calculates the file weight values of all the data files, and sorts all the data files according to the size of the file weight values, wherein the larger the file weight value is, the more front the sorting is. As the number of the searched data files may be large, and the data files in the lower order are different from the needs of the user, in this embodiment, the data files in the preset search number in the upper order are selected, for example, 1000 data files before the examination are sorted. There are many kinds of file weight value algorithms for data files, which can be referred to in the prior art. Alternatively, that data file in this embodiment include, but are not limited to, information file, technical question and answer files, model selection guide files, test report file, data sheet files, product change notice and EOL information files, software development environment files, hardware development environment files and the like, which are not exhaustively listed herein and can be understood. All information related to electronic components can be used as data files.

After the website server inquires and obtains the data files containing the search keywords, the data files with the same type labels are gathered into an aggregation column, wherein, the type labels are preset when the data files are stored in the website server, or are set after being stored in the website server; alternatively, each profile may be provide with one or more type labels. Alternatively, Type labels include technical FAQs, information, selection Guides, test Reports, data Sheets, product change notifications and EOL information, software development environment, hardware development environment, FAQs, comparison table, success stories, model naming rules, electronic component functional block diagrams, application handwriting, design guides, applications and schemes, user's guide, circuit schematics, development code, inventory lists, vendor descriptions, evaluation board instructions, training documents, electronic component applications and Introductions, etc are not exhaustively enumerated here.

It can be understood that the data files stored in the website server are very large and the data types are various, each retrieval result contains a large number of data files, if the data files are not classified and displayed, the display will be disorganized, and it is difficult for users to find the content they need. Therefore, in this embodiment, a corresponding type label is set for each data file, and the type label corresponds to the content of the data file. After a plurality of data files are searched out, the data files with the same type label are gathered into an aggregation column, that is, the data of the same type are gathered and displayed together, which is convenient for a user to view.

And S3, the website server calculates the file weight value of each data file in each aggregation column, and all the data files in each aggregation column are sorted from large to small according to the file weight value.

And S4, that website server takes the largest file weight value in each aggregation column as a column weight value of the aggregation column, and all the aggregation column are sorted from large to small according to the column weight values. Specifically, this embodiment uses the same weight value calculation method to calculate the weight value, wherein the file weight value of each data file is calculated directly, and the column weight value of the aggregation column is not calculated directly, but the data file ranked first in the aggregation column is used as the column weight value of the aggregation column, so as to ensure that all search results have consistent evaluation of the weight values.

And S5, the website server sends the query results of the classification and the sorting to a webpage for display, all aggregation columns are displayed in a top-down order, all data files in each aggregation column are displayed in a top-down order, and the display content of each data file is brief information including the main content of the data file.

Specifically, all the aggregation columns are sorted by the column weight values, and when the webpage of the user terminal is displayed, all the aggregation columns are displayed from top to bottom according to a sorting rule. If the search result is more than the display content of one web page, the page number flag is automatically generated, and after the user views the current page, the page number flag is used to select the next page to continue reading. In the embodiment, the display content of each data file is the brief information including the main content of the data file, but not all contents of the data file are displayed, so that more data files can be displayed in one page, meanwhile, the user can be ensured to obtain the main content of each data file, and the reading efficiency of the user is improved. It can be understood that the brief information of the data file can be selected according to the needs, which can reflect the main content of the data file. Alternatively, the brief information of this embodiment includes a file title, a file abstract, a type tag, and a release date, and the user can quickly know whether the data file is necessary for the user through the brief information, and then judge whether the data file needs to be opened. Alternatively, in the component e-commerce platform search result classification display method of this embodiment, the file title, file abstract, type tag, and release date of each data file in step S5 are distinguished by using one or more of font color, background color, font size, font gray scale, and highlight.

Further, in the method for displaying the search results of the component e-commerce platform by classification in this embodiment, the displaying of all the data files in each aggregation column in the step S5 from top to bottom includes:

S51, judging whether that number of the data files in each aggregation column is larger than the preset display number.

S52, if it is, displaying a preset number of data files at the top of the order in the aggregation column, and displaying the extended reading flag below the last data file.

S53. If the extended reading flag receives an extended viewing instruction, a new web page is popped up to display all the data files in the aggregation column.

Alternatively, in the method for displaying the search results of the component e-commerce platform by classification in this embodiment, in step S5, one or more of font color, background color, font size, font grayscale and highlight are used to distinguish between display areas of different aggregate columns.

Alternatively, in the method for displaying the search results of the component e-commerce platform by classification in this embodiment, in step S5, one or more of font color, background color, font size, font grayscale and highlight are used to highlight the search keyword.

Alternatively, in the method for displaying the search results of the component e-commerce platform by classification in this embodiment, if a certain display content of the data file is a hyperlink, when the mouse cursor is moved to the hyperlink, the display color of the display content is correspondingly changed and/or the mouse cursor is deformed.

Further, in the method for displaying the search results of the component e-commerce platform by classification in this embodiment, after step S5, the method further comprises:

S6, popping up a new webpage to display that webpage corresponding to the data file or the hyperlink if an open instruction is received by the hyperlink corresponding to a certain data file or a certain display content in the webpage.

In that embodiment, the same content type are aggregated and display, so that the effect of visual focus can be achieved, the order is clear, the key points are highlight, a user can conveniently browse the query result in a targeted manner, and the query efficiency is improved.

The embodiments are described in this specification in a progressive manner, with emphasis being placed on the differences between each embodiment and the other embodiments, and with reference to like parts of the embodiments. As for the device disclosed in the embodiment, since it corresponds to the method disclosed in the embodiment, the description is relatively simple, and the description of the related part can be referred to the method part.

Those skilled in the art will further appreciate that the example elements and algorithm steps described in connection with the embodiments disclosed herein can be implemented as electronic hardware, computer software, or a combination of both, and that the example components and steps have been described generally functionally throughout the foregoing description in order to clearly illustrate the interchangeability of hardware and software. Whether these functions are performed in hardware or software depends on the particular application and design constraints of the technical solution. Killed artisans may implement the described functionality using different approaches for each particular application, but such implementations should not be construed as beyond the scope of the present invention.

The steps of a method or algorithm described in connection with the embodiments disclosed herein may be embodied directly in hardware, in a software module executed by a processor, or in a combination of the two. A software module may reside in random access memory (RAM), memory, read only memory (ROM), electrically programmable ROM, electrically erasable programmable ROM, registers, hard disk, a removable disk, a CD-ROM, or any other form of storage medium known in the art.

The above embodiments are only for illustrating the technical concepts and features of the present invention, and are intended to enable those skilled in the art to understand and implement the present invention, but not to limit the scope of protection of the present invention. All equivalent change and modifications that come within that scope of the append claims are intended to be embraced therein.

What is claimed is:

1. A method for displaying search results of a component e-commerce platform by classification, wherein a website server of the component e-commerce platform stores webpage data and related information of various components, and the method comprises:

S1, receiving a search keyword by the webpage of the component e-commerce platform, and sending the search keyword to the website server;

S2, inquiring by the website server to obtain the data files containing the search keyword, and gathering the data files with the same type labels into an aggregation column, wherein the type labels are preset when the data files are stored in the website server, and the type labels comprise technical frequently asked questions (FAQs), information, type selection guides, test reports, datasheets, product change notice and end-of-life (EOL) information, software development environment, hardware development environment;

S3, calculating a file weight value of each data file in each aggregation column by the website server, and all the data files in each aggregation column are sorted from large to small according to the file weight value;

S4, taking the maximum file weight value by the website server in each aggregation column as a column item weight value of the aggregation column, and all the aggregation columns are sorted from large to small according to the column item weight values, wherein the data files in the lower sorted order are different from needs of a user;

S5, sending the query results of the classification and sorting to the webpage to be displayed by the website server, all the aggregation columns are displayed from top to bottom, all the data files in each aggregation column are displayed from top to bottom, and the display content of each data file is brief information including main content of the data file; wherein if a display content of the data file is a hyperlink, when the mouse cursor is moved to the hyperlink, the display color of the display content is changed correspondingly and/or the mouse cursor is deformed.

2. The method for displaying search results of a component e-commerce platform by classification according to claim 1, wherein the step of inquiring by the server to obtain the data file containing the search keyword comprises:

inquiring to obtain the data files containing the search keywords, calculating the file weight values of all the data files, sorting all the data files according to the file weight values, and screening out a preset search number of data files in front of the sorting by the website server.

3. The method for displaying search results of a component e-commerce platform by classification according to claim 1, wherein displaying all the data files in each aggregation columns in the step S5 according to the sequence from top to bottom comprises:

S51, judging whether the number of the data files in each aggregation column is larger than a preset display number;

S52, if it is, displaying the preset number of data files at the top of the order in the aggregation column, and displaying an extended reading flag below the last data file;

S53. if the extended reading flag receives an extended viewing instruction, a new webpage is popped up to display all the data files in the aggregation column.

4. The method for displaying search results of a component e-commerce platform by classification according to claim 1, wherein the brief information of each data file in step S5 comprises a file title, a file abstract, a type label, and a release date.

5. The method for displaying search results of a component e-commerce platform by classification according to claim 4, wherein the file title, the file abstract, the type label, and the release date of each data file in step S5 are distinguished by one or more of font color, background color, font size, font grayscale, and highlight.

6. The method for displaying search results of a component e-commerce platform by classification according to claim 1, wherein in step S5, one or more of font color, background color, font size, font grayscale, and highlight are used to distinguish display areas of different aggregation columns.

7. The method for displaying search results of a component e-commerce platform by classification according to claim 1, wherein in step S5, one or more of font color, background color, font size, font grayscale and highlight are used to highlight the search keyword.

8. The method for displaying search results of a component e-commerce platform by classification according to claim 1, wherein after the step S5, the method further comprises:

S6, popping up a new webpage to display a webpage corresponding to the data file or the hyperlink if an open instruction is received by the hyperlink corresponding to one of the data files or one of the display content in the webpage.

9. The method for displaying search results of a component e-commerce platform by classification according to claim 1, wherein the type label further comprises frequently asked questions (FAQs), comparison tables, successful cases, model naming rules, electronic component function block diagrams, application handwritings, design guides, application and schemes, user guides, circuit schematic diagrams, development codes, inventory lists, and supplier introductions, evaluation board instructions, training documents, electronic component applications and introductions;

each data file can be provided with one or more type tags.

* * * * *